United States Patent [19]

Hugus et al.

[11] Patent Number: 4,556,963
[45] Date of Patent: Dec. 3, 1985

[54] UNDERWATER SOUND GENERATOR

[75] Inventors: George D. Hugus, Orlando; A. Mark Young, Winter Park, both of Fla.

[73] Assignee: The United States of America as represented by the Secretary of the Navy, Washington, D.C.

[21] Appl. No.: 445,875

[22] Filed: Dec. 1, 1982

[51] Int. Cl.$^4$ .......................... G01V 1/38; G01V 1/04; H04B 11/00

[52] U.S. Cl. .................................. 367/143; 181/120; 116/137 A

[58] Field of Search ............... 367/143, 142, 141, 174, 367/175; 181/120, 118; 116/137 A

[56] References Cited

U.S. PATENT DOCUMENTS

| | | | |
|---|---|---|---|
| 3,212,473 | 10/1965 | Bouyoucos | 367/143 |
| 3,382,841 | 5/1968 | Bouyoucos | 367/143 |
| 3,392,369 | 7/1968 | Dickie et al. | 367/143 |
| 3,394,775 | 7/1968 | Cole et al. | 367/143 |
| 3,403,374 | 9/1968 | Mellen et al. | 367/143 |
| 3,676,840 | 7/1972 | Bays | 367/143 |
| 3,691,516 | 9/1972 | Graham et al. | 367/143 |
| 3,978,940 | 9/1976 | Bouyoucos | 367/143 |
| 3,993,973 | 11/1976 | Hutchins et al. | 367/172 |
| 4,047,148 | 9/1977 | Hageman | 367/143 |
| 4,396,088 | 8/1983 | Bayhi | 367/143 |

OTHER PUBLICATIONS

G. D. Hugus, III, "Development of Hydraulically Powered Low Frequency, Underwater Sound Projectors", J. Acoustical Society of America, Supple. 1, vol. 70, Fall 1981, pp. 519–520.

Primary Examiner—Nelson Moskowitz
Assistant Examiner—Ian J. Lobo
Attorney, Agent, or Firm—Robert F. Beers; William T. Ellis; Charles S. Guenzer

[57] ABSTRACT

An underwater sound generator comprising dual opposed pistons in a housing. Dynamic seal assemblies of flexible waterproof material are compressed against the peripheries of the pistons and the housing and form a watertight seal that allows axial motion. Controllers regulate the delivery of pressurized hydraulic fluid to hydraulic actuators which drive the axial motion of the pistons according to a predetermined variation.

10 Claims, 4 Drawing Figures

UNDERWATER SOUND GENERATOR

FIELD OF THE INVENTION

This invention relates in general to underwater sound generators and in particular to underwater sound generators having a high acoustic output over a significant range of low frequencies.

PRIOR ART

Sound needs to be generated underwater or within a liquid in a number of applications, such as sonar, seismic exploration, or underwater communication. Many types of underwater sound generators are known in the art. For high powered uses which are typical in a marine environment the sound generator is usually made resonant which maximizes power output. However resonant generators can deliver significant power over only a narrow bandwidth. The limitation upon bandwidth prevents the use of such resonant generators when a wide range of frequencies is required. Such applications include the calibration of hydrophones for which it is desirable to quickly sweep the generator over a wide frequency range of at least one decade and it is further necessary that the generator have a high acoustic output that is calibrated over the entire frequency range. The problems with a scannable generator are particularly severe between 1 and 10 Hz and remain significant for high-powered scannable generators between 10 and 100 Hz.

Examples of underwater sound generators are given in U.S. Pat. Nos. 3,212,473 and 3,382,841 issued to J. V. Bouyoucos. Both patents disclose sound generators which are driven by an hydraulic actuator operating at an arbitrary frequency within the operating range of the generator. U.S. Pat. No. 3,212,473 discloses a sound generator having a separate circumferential sealing ring around an acoustic piston head or the piston shaft integral to the piston head. The piston slides over the sealing ring. The watertight integrity of the hydraulic system is maintained not by the sealing ring but by a separate flexible membrane covering the piston radiator. The operation of this sound generator is made resonant by additional hydraulic or spring loading of the piston shaft. The sound generator of U.S. Pat. No. 3,382,841 does not use a rigid piston but instead relies on a flexing disc, semi-rigid over its central portion and flexible over an annulus adjacent to its rim that is rigidly fixed in a watertight fashion to the generator housing. The hydraulic actuator presses outward on the center of the disc causing a deformation relative to the housing and thus generating pressure waves on the water in contact with the exterior of the disc. The resonant frequency of this sound generator is determined by the mass and elastic properties of the flexing disc so that the operating frequency range is restricted if large acoustic output is desired. Furthermore in resonant operation, the acoustic output may be out of phase with the pressure signal on the actuator.

SUMMARY OF THE INVENTION

Therefore it is an object of this invention to provide a sound generator for use in a liquid environment.

It is another object of this invention to provide an underwater sound generator capable of high powered nonresonant operation.

It is a further object of this invention to provide an underwater sound generator capable of providing calibrated acoustic power over a wide range of low frequencies.

The invention is an underwater sound generator comprising one or more pistons joined by watertight circumferential seals to the housing. The pistons are moved in the axial direction as a plane surface by a mechanical actuator the time-varying position of which is arbitrarily determined by a controller. The invention was implemented, in one embodiment, with dual opposed pistons, each driven by a hydraulic actuator and a servo controller.

DESCRIPTION OF THE PREFERRED EMBODIMENTS

Figure 1:
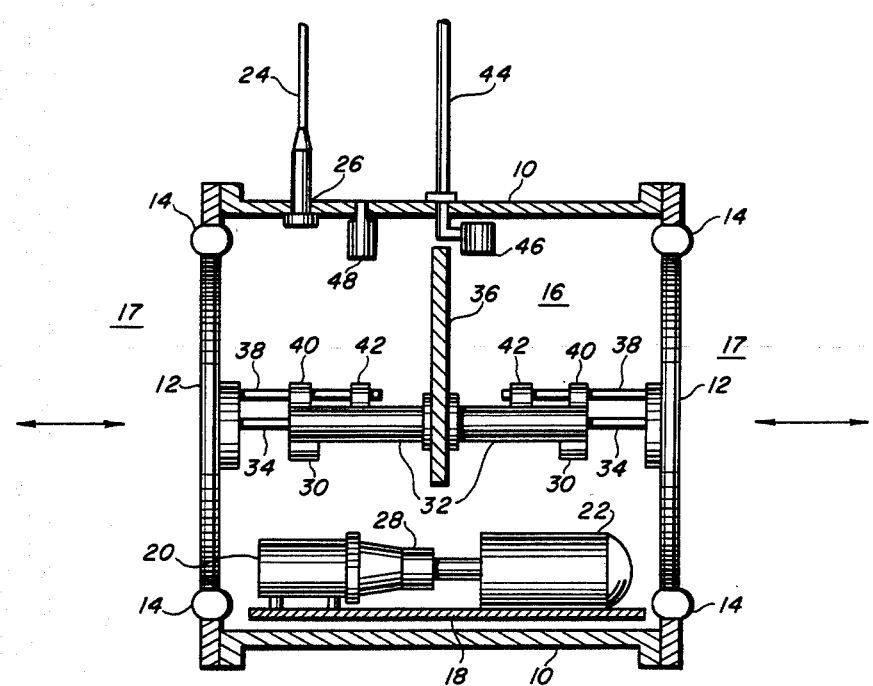
FIG. 1 is a cross-section view of one embodiment of the invention.

Referring now to the drawings, wherein like reference numerals designate identical or corresponding parts throughout the several views, and more particularly to FIG. 1 thereof, in which is shown in cross-section a dual opposed piston sound generator built according to the invention. A housing 10 generally cylindrical about the tranverse axis is made from a rigid material such as aluminum or steel and designed to be watertight. At the circular apertures on each end of the housing 10 are placed cylindrical acoustic pistons 12 slightly smaller than the apertures in the housing 10. The piston 12 stiff enough so that it operates below the lowest flexural mode of the piston 12. Across the gap between the piston 12 and housing 10 are placed dynamic seal assemblies 14 to be described in more detail later. The seal assemblies 14 are dynamic allowing some movement of the pistons 12 in an axial or transverse direction but the combination of housing 10, pistons 12, and seal assemblies 14 are watertight so that the housing interior 16 is isolated from the exterior or ambient environment 17.

Within the housing interior 16 and fixed to a motor shelf 18, itself attached to the housing 10, are an electric motor 20 and fluid resevoir 22. Electric power is supplied to the electric motor 20 through a power and signal cable system 24 which penetrates the housing 10 through a watertight electrical feedthrough 26. A drive shaft, not shown, of the motor 20, drives a hydraulic pump 28 which draws fluid from the fluid reservoir 22. The pump 28 pressurizes the fluid and delivers it via unshown fluid lines through the servo valves 30 to the two hydraulic actuators 32.

The servo valves 30 modulate the pressure on the fluid delivered to the actuators 32 thereby causing a displacement of the connecting rod 34 inserted in the actuator 32 resulting in an equal displacement of the acoustic piston 12. Electrical control lines, included in the power and control cable system 24 control the servo valves 30. Fluid return lines, not shown, return fluid from the actuators 32 to the fluid reservoir 22. Each actuator 32 is connected by a connecting rod 34 to an acoustic piston 12. The two actuators 32 are both connected to a central bracket 36, itself rigidly attached to the housing 10. The actuators 32 are positioned so that the connecting rods 34 deliver power to the middle of the pistons 12 and perpendicularly to their surfaces. This orientation is maintained by guide bars 38 each of which is attached at one end to the pistons 12 and the other ends of which slide through and are guided by linear motion bearings 40 and 42 mounted on the side of the actuator 32.

The pressure within the housing interior 16 is controlled close to that of the ambient 17 by a watertight compressed air or gas hose 44 penetrating the housing 10 and a pilot-activated pressure regulator 46 on the end of the air hose 44 within the housing interior. The regulator 46 senses through means not shown the pressure of the ambient 17 and allows gas to flow through the air hose 44 into the housing interior 16 in order for it to reach the exterior pressure. A pressure relief valve sytem 48 comprising four check valves penetrating the housing 10 vents gas to the exterior 17 whenever the pressure in the housing interior 16 substantially exceeds that of the exterior 17. The combination of the pressure regulator 46 and the pressure relief valve system 48 constitutes the pressure maintaining means which keeps the pressure in the housing interior 16 to within 0.5 psi of the pressure of the exterior 17.

Figure 2:
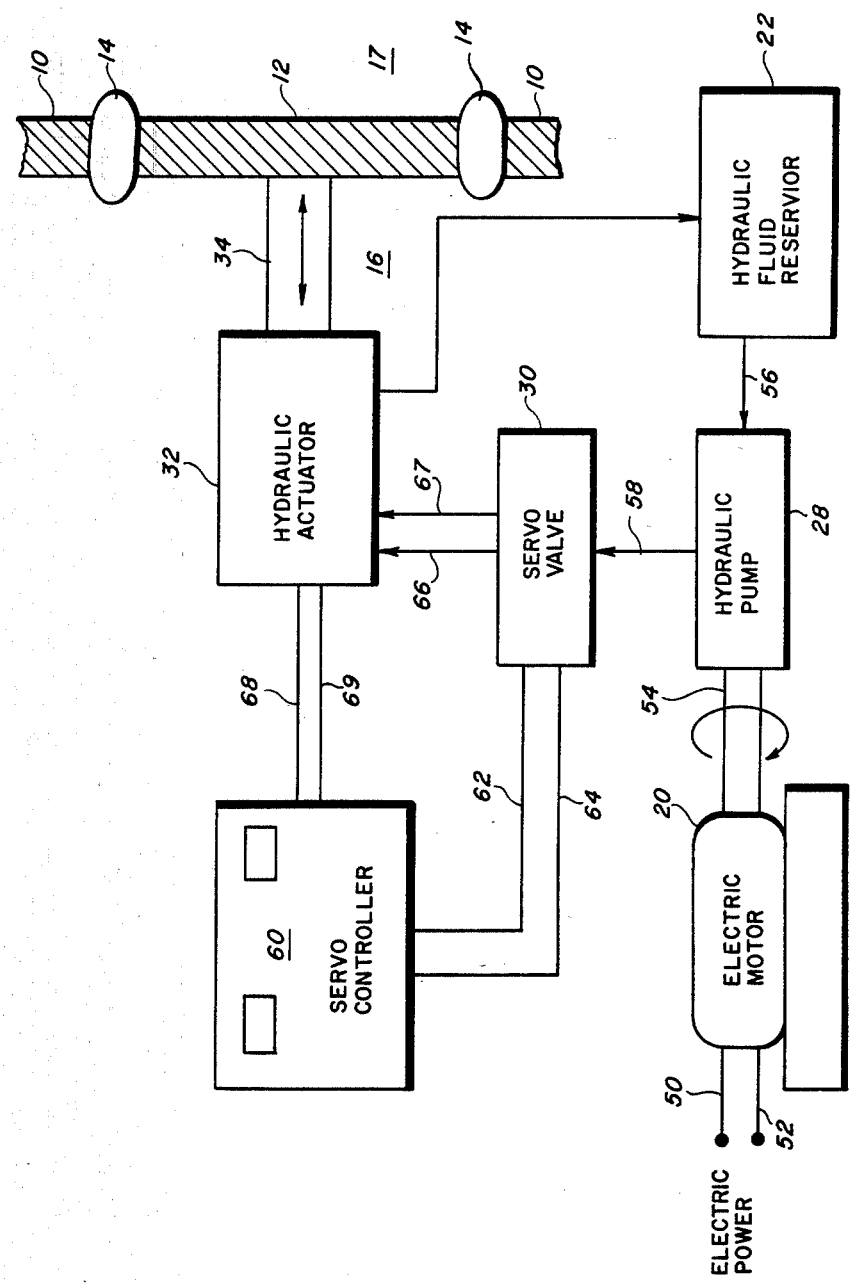
FIG. 2 is a schematic representation of the control circuit for hydraulic power.

The power and control system is shown in greater detail in the schematic of FIG. 2. Two electric power lines 50 and 52 deliver power to the electric motor 20 the shaft 54 of which delivers rotational power to the hydraulic pump 28.

Hydraulic fluid is drawn from the hydraulic fluid reservoir 22 through a supply fluid line 56 to the hydraulic pump 28 where it is pumped at high pressure through the delivery fluid line 58 to the servo valve 30.

A servo controller system 60, located where the system operator can adjust it, is connected by two servo valve control lines 62 and 64 through the power and control cable 24 to the servo valve 30. The servo controller system 60 and servo valve 30 act to modulate the pressure delivered through the actuator fluid lines 66 and 67 to the hydraulic actuator 32. The fluid lines 66 and 67 deliver pressurized fluid to opposing sides of an internal spool within the hydralic actuator that is attached to the connecting rod 34. As a result positive force is delivered for both directions of the stroke of the piston 12.

The servo controller system 60 can be of any type that controls the displacement of the piston actuator according to a predetermined variation. The servo controller used in the example was a model 8830 servo controller manufactured by Mechanical Technology Inc. in which a function generator provides a sinusoidal reference signal input of variable frequency between 1 and 100 Hz and of an amplitude corresponding to the desired sound generator output level. A magnetic core attached to the hydraulic connecting rod 34 fits within a linear variable differential transformer (LVDT). A dither oscillator provides a signal to one side of the LVDT. The coupling across the LVDT is determined by the position of the magnetic core within the LVDT. The resulting coupled feedback signal is lead via two leads to the servo controller which algebraically sums the feedback signal and the reference signal to produce an error signal output used to drive the servo valve 30.

Additional input and output buffer ampliflers are used to match impedances. Further details on servo control circuitry may be found in Electronic Engineers' Handbook, McGraw-Hill, 1975, Section 17-137. Variations in pressure in the fluid delivered to the actuator 32 through the actuator fluid lines 66 and 67 will produce variations in the force exerted upon the connecting rod 34 and consequently upon the piston 12. An increasing outward force toward the piston 12 or exterior 17 outside the housing 10 and piston 12 will cause an increased but finite displacement of the piston 12 outward from the housing interior 16. Conversely an increasing inward force will cause an inward displacement. A neutral displacement corresponds to some median pressures in the actuator fluid lines 66 and 67. The servo valve can be screwed directly into two threaded ports of the actuator 32 obviating the need for a separate actuator fluid lines 66 and 67. Electrical actuator monitor lines 68 and 69 leads from the actuator 32 to the servo controller system 60 and allows feedback from the LVDT in the actuator 32 to the controller 60 indicating what displacement has been reached in the actuator 32.

Figure 3:
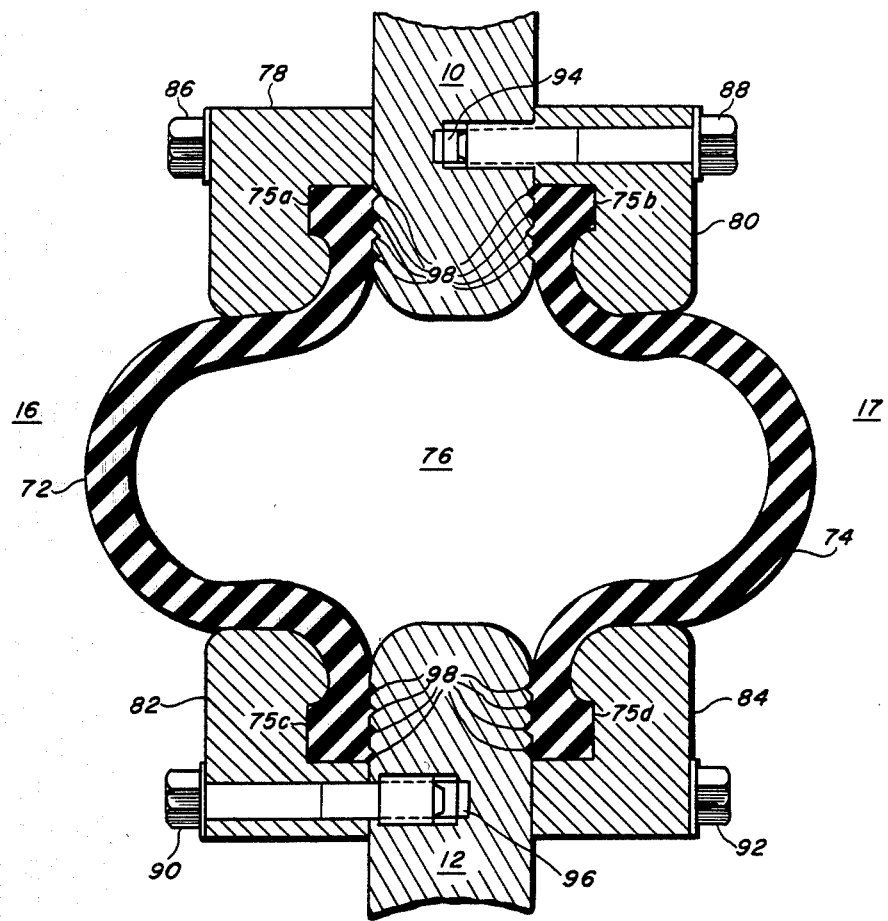
FIG. 3 is a cross-section view of a type of dynamic seal assembly useful in this invention.

An important part of a sound generator built according to this invention is the seal assembly 14 because it must simultaneously form a watertight seal yet be flexible enough to allow relatively free movement of the piston 12 in the axial direction within a restricted range. A satifactory seal has been built with a cross-section shown in FIG. 3. The seal assembly extends around the periphery of the piston 12, forming a watertight bridge between it and the housing 10. The seal assembly comprises two rubber seals 72 and 74, one on the side of the housing 10 and piston 12 facing the housing interior 16, the other on the side facing the ambient 17. Each of the seals 72 and 74 are annular strips that are convoluted so as to bulge away from the housing 10 and piston 12 thus leaving an oval seal void 76 interior to the seals 72 and 74. The lateral ends of the seals 72 and 74 are compressed against the housing 10 or piston by seal rings 78, 80, 82 and 84 each of which is forced against the housing 10 or piston 12 by a series of machine screws 86, 88, 90 and 92, screwed into blind tapped holes 94 and 96 in the housing 10 and piston 12. The watertight integrity of the seals 72 and 74 is improved by a series of circumferential grooves 98 cut into both sides of the housing 10 and piston 12 aginst which the seals 72 and 74 will be compressed. The seals 72 and 74 are fabricated with lips 75a, 75b, 75c, and 75d designed by criteria well-known in the fabrication of o-rings so that with increasing pressure the lips 75a–75d tightly seal to the correspondingly shaped sealing rings 78–84. The seal interior 76 is filled with demineralized water. The dual seals 72 and 74 act redundantly to increase reliability and the water-filled seal void 76 is non-polluting if the exterior seal 74 fails.

Figure 4:
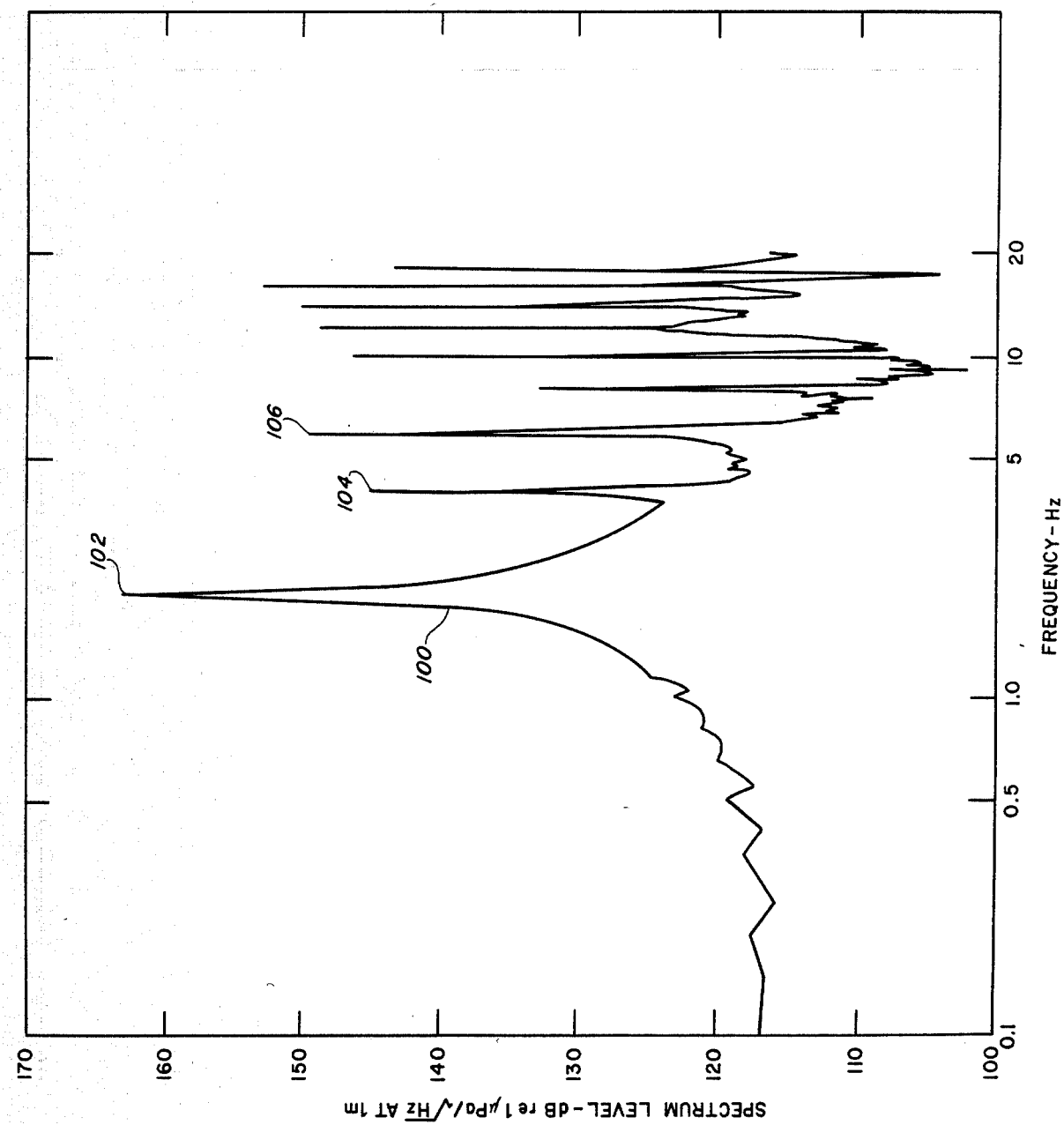
FIG. 4 is a graph of the measured acoustic power for a sound generator built according to this invention and operating at 2 Hz. The horizontal axis is frequency measured in hertz. The vertical axis is spectrum level power measured in dB relative to 1 micropascal per root hertz measured at 1 m.

A sound generator was built according to the preceding description. There was a single servo controller system 60, a single hydraulic pump 28, and a single fluid resevoir 22, but dual servo valves 30, dual servo controllers governing the valves 30, dual actuators 32 and dual pistons 12. The housing 10, pistons 12 and sealing rings 78–84 were made of 6061T6 aluminum alloy. The pistons 10 were 1 m in diameter and the separation between the faces of the pistons was 168 cm. The seals 72 and 74 were made of Butadiene-Acrylonitrile, a polymer which also goes by the names of Nitrile, BunaN, or NBR and which is highly resistant to attack from hydraulic oil. The pressure in the fluid lines was varied so that the peak to peak displacement of the piston 12 was 5.6 cm. The spectrum level of the sound generated was then measured as a function of frequency for underwater operation at 2 Hz as controlled by the servo controller. The measured spectrum level is represented by curve 106 shown in the graph of FIG. 4. The spectrum level is the quantity 20 log $P/P_o$ where P is the measured pressure at 1 m from the center of the sound source and $P_o$ is the reference pressure of 1 micropascal per root hertz. The measurements were typically taken at 2 to 3 meters and extrapolated to 1 m using a point source approximation. The power has a peak 102 of over 160 db at the non-resonant operating frequency of 2 Hz. Substantial power is also present at the harmonics of the operating frequency indicated by the 4 Hz peak 104, 6 Hz peak 106, etc.

It is to be appreciated that it is not crucial that the sound generator of this invention be implemented with dual opposed pistons. Alternatively, single pistons attached to a heavy or rigid housing would effectively work as would sound generators comprising more than two pistons. Furthermore although hydraulically activated pistons have been found to be useful for marine applications, any kind of controlled reciprocating power can be used to actuate the pistons.

The pistons are most easily realized in a disc-like shape but other and more complicated shapes can be utilized in this invention, such as rectangular pistons or pistons with a dome-shaped exterior. Other types of seals may be utilized than a double outward bulging seal as long as significant axial displacement is allowed while liquid integrity is maintained.

What has been described is a novel underwater sound generator using pistons, dynamic seal assemblies fixed to and joining the pistons and the housing, and a power source operating the generator at an arbitrary frequency. The design of the sound generator can provide calibrated high acoustic outputs over a wide requency range and is particularly useful between 1 and 100 Hz.

Obviously, additional modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A non-resonant sound generator, for use in a liquid, comprising:
    (a) A rigid housing substantially impervious to the liquid, with one or more piston apertures through its walls;
    (b) A piston that fits within each piston aperture and contacts said liquid on the exterior side of said housing;
    (c) Dynamic seal assemblies, substantially impervious to the liquid, joining the peripheries of said pistons to the boundaries of said piston apertures, to form a seal against the liquid;
    (d) A space within said housing in which a gas may be present, defined by the housing, pistons, and dynamic seal assemblies;
    (e) power means for moving said pistons perpendicularly to said piston apertures;
    (f) control means for regulating the movement of said pistons by said power means, said control means allowing for the adjustment of the frequency of piston movement; and
    (g) pressure regulating means for maintaining the pressure within said housing interior relative to the pressure of said liquid;
    wherein, the mass and stiffness of elements (b), (e), and (f) are chosen such that any mechanically resonant frequencies are above the selected operating frequency of the sound generator; and
    wherein each of the said dynamic seal assemblies comprises a flexible, convoluted seal and means for compressing one side thereof against the housing.

2. A non-resonant sound generator, for use in a liquid, comprising:
    (a) a rigid housing substantially impervious to the liquid, with one or more piston apertures through its walls;
    (b) a piston that fits within each piston aperture and contacts said liquid on the exterior side of said housing;
    (c) dynamic seal assemblies, substantially impervious to the liquid, joining the peripheries of said pistons to the boundaries of said piston apertures, to form a seal against the liquid;
    (d) a space within said housing in which a gas may be present, defined by the housing, pistons, and dynamic seal assemblies;
    (e) power means for moving said pistons perpndicularly to said piston apertures;
    (f) control means for regulating the movement of said pistons by said power means, said control means allowing for the adjustment of the frequency of piston movement; and
    (g) pressure regulating means for maintaining the pressure within said housing interior relative to the pressure of said liquid;
    wherein, the mass and stiffness of elements (b), (e), and (f) are chosen such that any mechanically resonant frequencies are above the selected operating frequency of the sound generator; and
    wherein each of the said dynamic seal assemblies comprises two convoluted seals forming a void between them, means for compressing said seals against the piston and the housing, and further comprising a liquid substantially filling said void.

3. A sound generator for use in a liquid, as recited in claim 2, wherein the dynamic seal assembly comprises a flexible convoluted seal and means for compressing one side thereof against the piston and the other side thereof against the housing.

4. A sound generator for use in a liquid, as recited in claim 2, wherein the dynamic seal assembly comprises two convoluted seals forming a void between them, means for compressing said seals against the piston and the housing and further comprising a liquid substantially filling said void.

5. A non-resonant sound generator, for use in a liquid, comprising:
    (a) a rigid housing substantially impervious to the liquid, with two piston apertures through opposite walls of said housing;
    (b) two pistons that fit within the piston apertures and contact said liquid on the exterior side of said housing;
    (c) two sets of dynamic seal assemblies, each set comprising two flexible convoluted seals against the piston and housing, each set forming a seal substantially impervious to the liquid and forming a void between the convoluted seals and further comprising a liquid substantially filing said void, wherein the dynamic seal assemblies, in additional to sealing out liquid, also act to center the piston in the cylinder;

(d) hydraulic fluid;

(e) two hydraulic actuators, each attached to a separate piston for causing a displacement in its attached piston in relation to the pressure of the hydraulic fluid in said actuator;

(f) two valves, each regulating the pressure of the hydraulic fluid in separate hydraulic actuators;

(g) a controller that regulates the valves to provide an adjustable frequency variation of pressure to the hydraulic actuators, said controller means allowing for adjustment of the frequency of piston movement;

(h) gas contained within the housing interior defined by the housing, pistons, and dynamic seal assemblies; and (i) pressure regulating means for maintaining the pressure within said housing interior substantially equal to the pressure of said liquid;

wherein, the mass and stiffness of elements (b), (c), (d), (e), (f), (g), and (i) are chosen such that any mechanically resonant frequencies are above the selected operating frequency of the sound generator.

6. A sound generator for use in a liquid, as recited in claim 5, further comprising:

a fluid reservoir that receives the hydraulic fluid from said fluid reservoir, a hydraulic pump that draws the hydraulic fluid from the fluid reservoir, pressurizes said hydraulic fluid, and delivers said hydraulic fluid to the valves; and an electric motor for driving said pump.

7. A sound generator for use in a liquid as recited in claim 5, wherein said pressure regulating means comprise:

a gas hose providing pressurized air to said housing interior;

a pilot-operated pressure regulator connected to the end of said gas hose within said housing interior; and an overpressure discharge check valve in the housing.

8. A non-resonant sound generator for use in a liquid, comprising:

(a) an aluminum housing substantially impervious to the liquid with two circular piston apertures through opposite walls of said housing;

(b) two pistons that fit within said piston apertures;

(c) two sets of dynamic seal assemblies, each set comprising two annular flexible strips impervious to the liquid and convoluted to form a void between said strips, means for compressing set strips of a set against opposing sides of a piston and the housing and further comprising a seal liquid substantially filling said void wherein the dynamic seal assemblies, in additional to sealing out liquid, also act to center the piston in the cylinder;

(d) two connecting rods attached to separate pistons;

(e) hydraulic fluid;

(f) two hydraulic actuators, each moving separate connecting rods to cause displacement of said rod in relation to the pressure of the hydraulic fluid in said actuator;

(g) two valves, each regulating the pressure of the hydraulic fluid in separate hydraulic actuators;

(h) a controller that measures the displacement of the pistons and that regulates the valves to provide an adjustable frequency variation of pressure to the hydraulic actuators, said controller means allowing for adjustment of the frequency of piston movement;

(i) a fluid reservoir that accepts the hydraulic fluid returning from the actuators;

(j) a pump that pressurizes the fluid from said fluid reservoir and delivers said fluid to the valves;

(k) an electric motor driving said pump;

(l) pressure regulating means for maintaining the pressure within said housing substantially equal to the pressure of the operating liquid.

wherein, the mass and stiffness of the pistons, connecting rods, and oil reservoirs, are chosen such that any mechanically resonant frequencies are above the selected operating frequency of the sound generator.

9. The sound generator of claim 1 wherein said power means comprise one or more hydraulic actuators; and said control means is a servo controller that controls the pressure delivered to said hydraulic actuators.

10. The sound generator of claim 2 wherein said power means comprise one or more hydraulic actuators; and said control means is a servo controller that controls the pressure delivered to said hydraulic actuators.

* * * * *